3,295,993
METHOD OF IMPROVING THE TASTE OF ARTIFICIAL SWEETENING AGENTS
Masaaki Yoshida, 562 5-chome, Saginomiya, Nakano-ku, Tokyo, Japan, and Masahide Yoshikawa, % Asagiku-so, 303 Yyuniso, Shinjyuku-ku, Tokyo, Japan
No Drawing. Filed Sept. 5, 1963, Ser. No. 306,698
Claims priority, application Japan, July 13, 1962, 37/29,027
9 Claims. (Cl. 99—141)

This application is a continuation-in-part of our copending application Serial No. 289,706, filed on June 21, 1963, and now abandoned.

This invention relates to synthetic sweetening agents of improved taste and to a method of preparing the same.

Saccharin, soluble saccharin, and the soluble salts of cyclohexanesulfamic acid, such as sodium cyclamate and calcium cyclamate, have a sweetening effect many times greater than that of sucrose, and they are without nutritive value. When solutions of these synthetic sweetening agents or of their mixtures are tasted in comparison with sucrose solutions of equal sweetening power, the taste of the natural product is found superior. The artificial agents have a characteristic taste component which may best be described as bitterness.

The objects of this invention are a method for removing such bitterness from saccharin and the cyclamates, and the improved sweetening agents obtained by the method.

We have found that the bitter taste component can be removed from aqueous solutions of saccharin and of soluble physiologically acceptable salts of cyclohexanesulfamic acid by treatment of the solutions with sodium chloride and with alkaline compounds. Because of the unpleasant taste and the physiological effects of such materials as alkali metal hydroxides, and the toxicity of potassium to humans, the sodium salts of physiologically tolerated weak acids are preferably employed in the method of our invention. Sodium bicarbonate and sodium salts of amino acids are typical of the sodium salts of weak acids suitable for our methods. Sodium glutamate is the amino acid salt most readily available at the lowest cost.

Merely adding common salt and sodium bicarbonate or sodium glutamate to an aqueous solution of the aforementioned synthetic sweetening agents is not sufficient for removing the bitter taste component. While the reagents, when added in relatively large amounts, may completely alter the taste of the solution, this is not the effect to be achieved. The reagents are to be used in amounts sufficiently small that their presence cannot be detected by their taste.

The exact nature of the reaction taking place is not fully understood but we have found that small amounts of sodium chloride and of alkaline materials, such as sodium bicarbonate or sodium glutamate, when added to a solution of saccharin or of a cyclamate, or of mixtures of the cyclamates with each other or with saccharin, cause the formation of an insoluble precipitate upon heating to a temperature at or near the boiling point of water. The precipitate may be separated from the remainder of the solution which is then found to have a taste substantially better than the original solution of the artificial sweetening agent or agents, and better than the mixure of the original solution with the reagents.

The improvement is greatest when the solution is rapidly cooled from the boiling range to a temperature near room temperature or lower; and an easily filtered precipitate of crystalline appearance is produced by such chilling. The precipitate has a distinct bitter taste. The clear filtrate when evaporated at ambient pressure or in a vacuum to a concentration greater than the solubility of the sweetening agent at room temperature yields crystals of the sweetening agent which are not visibly different from the starting material, but which yield aqueous solutions of a taste much closer to that of sucrose solutions. The sweetening strength of the treated material is unaffected.

It is difficult to separate the bitterness forming precipitate from a hot aqueous solution immediately after its formation. The boiling solution first becomes turbid and milky, and the precipitated particles appear to be extremely small. They grow with time, and particularly upon cooling. Rapid chilling not only improves the filtration behavior of the precipitate but also appears to cause more complete separation of the bitter constituent from the liquid phase. When cooling is slow, the improvement achieved is not as great as that available with cooling at a high rate.

The following examples further illustrate the method of the invention but it will be understood that the invention is not limited thereby.

*Example 1*

1.0 part soluble saccharin (saccharin sodium) and 5.0 parts sodium cyclohexylsulfamate were dissolved in a container in 330 parts water. 0.1 part sodium chloride and 0.02 part sodium bicarbonate were then added with stirring, and the clear solution produced was heated to a temperature at or near the boiling point for 20 minutes. It was then cooled to room temperature within a few minutes by immersion of the container in running cold water. The precipitate formed was removed from the liquid phase by filtration and the filtrate was evaporated until crystals formed. More than 90 percent of the original weight of the sweetening agents was recovered. The formed crystals yielded solutions free from the slightly bitter taste perceptible in the original solution both before and after the addition of the sodium chloride and the sodium bicarbonate.

Corresponding results were obtained when the concentration of the original solution was changed to 1.0 parts soluble saccharin and 1.2 parts sodium cyclohexyl sulfamate, and the amount of aded reagents was changed to 0.013 part sodium bicarbonate and 0.26 part sodium chloride. The combined amount of chloride and bicarbonate should not normally exceed 10% of the combined amount of the sweetening agents if it is not desired that the reagents significantly affect the taste of the product. The quantity of the reagents added to the sweetening agents may be reduced below the quantities indicated with a corresponding decrease in effectiveness. Since the sensitivity to bitterness varies greatly from one person to another, a generally valid lower limit of effectiveness of the reagent mixture cannot be established.

The concentration of the sweetening agents in the treated original solution should be sufficiently low to prevent precipitation of the desirable material with the bitter component upon heating and chilling. The solubilities of saccharin, soluble saccharin, and of the cyclamates are well known, and those skilled in the art will be guided accordingly in performing the method of the invention.

While a mixture of soluble saccharin with sodium or calcium hexyl sulfamate benefits particularly from the treatment by the method of the invention, the taste of each sweetening agent in the group consisting of saccharin, soluble saccharin, and the physiologically tolerated water soluble salts of hexanesulfamic acid may be individually improved by the method of our invention. This is believed to indicate a common chemical mechanism in the treating method but the nature of this mechanism has not yet been detected.

Sodium bicarbonate may be replaced by other weakly alkaline materials, more specifically, by the sodium salt of another physiologically tolerated weak acid, as illustrated by the following example.

*Example II*

A mixture of one part soluble saccharin and two parts sodium cyclohexyl sulfamate was dissolved at room temperature in sufficient water to make an almost saturated solution, i.e. about 20–35% water. 0.4 part sodium chloride and 0.7 part sodium glutamate were added, and the resulting solution was heated to boiling for about 30 minutes. The container holding the hot solution was then plunged into ice water, and the temperature of the solution was lowered with vigorous agitation to 5° C. within less than two minutes. A crystalline precipitate formed, and the remainder of the solution became turbid. The cold solution was filtered, and the clear filtrate had lost the bitter taste component noticeable prior to boiling. Crystallization of the sweetening agents from the partly evaporated filtrate yielded a solid product which was as effective a sweetening agent as the original mixture, but lacked bitterness.

*Example III*

One part soluble saccharin (saccharin sodium), 0.24 part sodium chloride, and 0.004 part sodium bicarbonate were dissolved in enough water to make a solution almost saturated at room temperature, i.e. about 20–35% water. The solution was boiled twenty minutes, and then quickly cooled to room temperature by tap water externally applied to the container. Filtration of the cooled solution yielded a clear filtrate free from the bitter taste noticeable prior to boiling. No unfavorable effects resulted from an extension of boiling time to 60 minutes, regardless of the concentration of sweetening agents or reagents. While the rate of cooling had a perceptible effect on the elimination of the bitter component, the lowest temperature reached upon rapid cooling was not found to have a significant effect if the minimum temperature was at or below room temperature (approximately 0° to 30° C.).

While the invention has been described with particular reference to specific embodiments, it is to be understood that it is not limited thereto but is to be construed broadly and restricted solely by the scope of the appended claims.

What we claim is:

1. A method of improving the taste of a sweetening agent selected from the group consisting of saccharin, soluble saccharin, and the physiologically tolerated water soluble salts of hexanesulfamic acid, which comprises:
    (a) treating said sweetening agent in aqueous solution at a temperature not substantially below the boiling point of said solution with sodium chloride and an alkaline material selected from the group consisting of sodium bicarbonate and sodium salts of amino acids, whereby a precipitate is formed in said solution; and
    (b) separating said precipitate from the remainder of said solution.

2. A method as set forth in claim 1, wherein said alkaline material is sodium bicarbonate.

3. A method as set forth in claim 1, wherein said alkaline material is sodium glutamate.

4. A method as set forth in claim 1, wherein said alkaline material is present in said solution in an effective amount smaller than the amount of said alkaline material which significantly affects the taste of said solution.

5. A method of improving the taste of a sweetening agent selected from the group consisting of saccharin, soluble saccharin, and the physiologically tolerated water soluble salts of hexanesulfamic acid, which comprises:
    (a) heating an aqueous solution of said sweetening agent to a temperature near the boiling point thereof in the presence of dissolved sodium chloride and of an alkaline dissolved material selected from the group consisting of sodium bicarbonate and sodium glutamate for a time sufficient to form a precipitate in said solution; and
    (b) separating said precipitate from the remainder of said solution.

6. A method as set forth in claim 5, which further comprises evaporating said remainder of said solution until a portion of said sweetening agent is precipitated therefrom.

7. A method as set forth in claim 5, wherein said time is less than 60 minutes.

8. A method as set forth in claim 5, which further comprises cooling said solution rapidly from said temperature to room temperature prior to separation of said precipitate from said remainder of said solution.

9. A method as set forth in claim 5, which further comprises cooling said solution rapidly from said temperature to a temperature between 0° C. and 20° C.

References Cited by the Examiner

UNITED STATES PATENTS

| | | | |
|---|---|---|---|
| 2,803,551 | 8/1957 | Helgren | 99—141 |
| 2,971,848 | 2/1961 | Polya | 99—141 |

A. LOUIS MONACELL, *Primary Examiner.*

RAYMOND N. JONES, S. E. HEYMAN,
*Assistant Examiners.*